United States Patent [19]

Claar et al.

[11] Patent Number: 4,798,746

[45] Date of Patent: Jan. 17, 1989

[54] BASECOAT/CLEARCOAT METHOD OF COATING UTILIZING AN ANHYDRIDE ADDITIVE IN THE THERMOPLASTIC POLYMER-CONTAINING BASECOAT FOR IMPROVED REPAIRABILITY

[75] Inventors: James A. Claar, Export; Stephen J. Thomas, Aspinwall; Betty J. Kindle, Oakmont, all of Pa.

[73] Assignee: PPG Industries, Inc., Pittsburgh, Pa.

[21] Appl. No.: 88,328

[22] Filed: Aug. 24, 1987

[51] Int. Cl.[4] .......................... B05D 1/36; B05D 7/00; C08L 33/14; C08L 35/00

[52] U.S. Cl. .................................. 427/407.1; 427/409; 525/207; 525/223

[58] Field of Search .................. 427/385.5, 386, 388.2, 427/407.1, 409; 525/207, 223

[56] References Cited

U.S. PATENT DOCUMENTS

| | | | |
|---|---|---|---|
| 3,972,961 | 8/1976 | Hammer et al. | 260/857 |
| 4,069,275 | 1/1978 | Labana et al. | 260/836 |
| 4,101,606 | 7/1978 | Cenci et al. | 260/857 |
| 4,145,513 | 3/1979 | Dalibor | 528/75 |
| 4,163,739 | 8/1979 | Dalibor | 260/31.2 R |
| 4,177,183 | 12/1979 | Dalibor | 260/31.4 R |
| 4,308,188 | 12/1981 | Wicks et al. | 260/29.6 HN |
| 4,415,697 | 11/1983 | Peng et al. | 525/223 X |
| 4,452,948 | 6/1984 | Marrion et al. | 525/207 |
| 4,620,994 | 11/1986 | Suss et al. | 427/409 X |

FOREIGN PATENT DOCUMENTS

| | | |
|---|---|---|
| 1417352 | 12/1975 | United Kingdom . |
| 1583316 | 1/1981 | United Kingdom . |

*Primary Examiner*—Michael Lusignan
*Attorney, Agent, or Firm*—Thomas M. Breininger

[57] ABSTRACT

Disclosed is a method of coating comprising the steps of: (I) coating a substrate with one or more applications of a pigmented basecoating composition comprising a thermoplastic, non-crosslinked, film-forming polymer having at least two functional groups per molecule which functional groups are co-reactive with acid anhydride moieties, to which basecoating composition has been added within 24 hours prior to coating the substrate, a carboxylic acid anhydride component having at least two cyclic anhydride groups in an amount so as to provide a ratio of equivalents of anhydride groups to equivalents of the co-reactive functional groups of at least 0.10:1.00 to form a basecoat; and (II) coating the basecoat with one or more applications of a transparent, crosslinking, topcoating composition comprising a crosslinkable, film-forming material and a crosslinking agent for the crosslinkable, film-forming material to form a transparent topcoat.

19 Claims, No Drawings

BASECOAT/CLEARCOAT METHOD OF COATING UTILIZING AN ANHYDRIDE ADDITIVE IN THE THERMOPLASTIC POLYMER-CONTAINING BASECOAT FOR IMPROVED REPAIRABILITY

BACKGROUND OF THE INVENTION

This invention relates to a method of coating involving applying to a substrate a pigmented basecoating composition containing a thermoplastic, non-crosslinked, film-forming polymer to form a basecoat and coating the basecoat with one or more applications of a transparent, crosslinking, topcoating composition containing a crosslinkable, film-forming material and a crosslinking agent for the crosslinkable, film-forming material to form a transparent topcoat (a so-called "color plus clear" type method of coating).

A number of known "color plus clear" methods of coating for providing automotive quality finishes, particularly in automotive refinishing applications, utilize two-package compositions based on hydroxyl-functional components and curing (crosslinking) agents containing isocyanate groups. However, the use of isocyanate-functional materials often requires that precautions be taken with respect to the handling and use of the isocyanates based on toxicity considerations. Such precautions can be relatively burdensome particularly when the coating compositions are utilized in environments not involving controlled factory conditions as exist, for example, in plants producing new automotive vehicles. For example, the application of automotive refinishing compositions tends to be done in refinishing shops under conditions which are not nearly as well controlled as those existing in automotive plants which manufacture original equipment. Accordingly, there is a need for high quality coating methods which are not based on the utilization of isocyanate curing agents in at least one, and preferably in both, of the pigmented basecoating and transparent topcoating compositions.

Irrespective of toxicity considerations with respect to the use of isocyanate crosslinking agents, in general there are problems associated with the use of topcoats based on crosslinking materials over basecoats based on non-crosslinked, thermoplastic film-forming polymers (for example, acrylic lacquer basecoats) in "color plus clear" methods of coating as utilized, for example, in automobile refinishing applications. One problem involves lack of repairability of the resulting composite coating. If, for example, a hardened composite film, resulting from a "color plus clear" application method during original equipment manufacture, contains imperfections, and thus needs to be sanded and repaired, it is critical that the composite film be readily susceptible to being repaired. Likewise, when the protective coating, for example on an automobile, becomes damaged during use of the article, it is important that the coating be readily susceptible to repair. The usual manifestation of a repairability problem involves lifting, wrinkling, etc. of the film in the area of the repair where the new coating is applied over the old one, such as in the "feather edge" area of repair where the new coating overlaps the old coating.

This "repairability" problem does not tend to occur when the composite film consists of a lacquer type topcoat over a lacquer type basecoat, but rather when the composite film is made up of a crosslinked topcoat over a non-crosslinked (e.g., lacquer type) basecoat. The present invention is directed, in part, to providing a "color plus clear" method of coating employing a non-crosslinked, thermoplastic film-forming polymer in the basecoating composition and a crosslinking, film-forming material in the topcoating composition which results in a hardened composite film which has excellent repairability characteristics. Other objects of the invention will become apparent to the reader infra.

SUMMARY OF THE INVENTION

The present invention is for a method of coating comprising the steps of: (I) coating a substrate with one or more applications of a pigmented basecoating composition comprising a thermoplastic, non-crosslinked, film-forming polymer having at least two functional groups per molecule which functional groups are co-reactive with acid anhydride moieties, to which basecoating composition has been added within 24 hours prior to coating the substrate, a carboxylic acid anhydride component having at least two cyclic anhydride groups in an amount so as to provide a ratio of equivalents of anhydride groups to equivalents of the co-reactive functional groups of at least 0.10:1.00 to form a basecoat; and (II) coating the basecoat with one or more applications of a transparent, crosslinking, topcoating composition comprising a crosslinkable, film-forming material and a crosslinking agent for the crosslinkable, film-forming material to form a transparent topcoat.

DETAILED DESCRIPTION OF THE INVENTION

The coating method of the invention can be thought of as comprising two principal steps. The first involves (I) coating a substrate with one or more applications of a pigmented basecoating composition comprising a thermoplastic, non-crosslinked, film-forming polymer having at least two functional groups per molecule which functional groups are co-reactive with acid anhydride moieties, to which basecoating composition has been added within 24 hours, preferably with 8 hours, prior to coating the substrate, a carboxylic acid anhydride component having at least two cyclic anhydride groups in an amount so as to provide a ratio of equivalents of anhydride groups to equivalents of the co-reactive functional groups of at least 0.10:1.00, preferably from 0.10:1.00 to 0.50:1.00. Step (I) results in a basecoat being formed on the substrate. The second step (II) comprises coating the basecoat from step (I) with one or more applications of a transparent, crosslinking topcoating composition comprising a crosslinkable, film-forming material and a crosslinking agent for the crosslinkable, film-forming material. Step (II) results in a transparent topcoat being formed over the basecoat. Typically the basecoat and the topcoat are allowed to harden together on the substrate under ambient atmospheric conditions; however, heating the resulting coating, for example at a temperature up to 180° F. (82.2° C.) or higher may be employed.

It is preferred that the functional groups of the thermoplastic, non-crosslinked, film-forming polymer of the basecoating composition which are co-reactive with acid anhydride moieties comprise hydroxyl groups. Typically the thermoplastic, non-crosslinked, film-forming polymer for the basecoating composition is an acrylic polymer having at least two hydroxyl groups per molecule.

Any hydroxyl-containing thermoplastic, non-crosslinked, film-forming polymer having at least two of the requisite, functional groups co-reactive with acid anhydride moieties may be employed in the basecoating composition for the method of the invention. Hydroxyl-containing organic thermoplastic polymers as well as methods for their preparation are well known in the polymer art. Of course, it is to be understood that the hydroxyl-containing thermoplastic polymers employable in the method of this invention include homopolymers, copolymers, terpolymers and the like and that mixtures of more than one type or class of polymers can be employed if desired. As used herein the term, "copolymer," is intended to include polymers derived from two or more monomers. Likewise, it is to be understood that the particular proportions of polymer units and molecular weights of the thermoplastic polymer components are not generally critical to the method of the invention.

Examples of hydroxyl-containing polymers for the basecoating composition include: thermoplastic polymers from the classes such as (a) acrylic polyols; (b) polyester polyols; (c) polyether polyols; (d) amide-containing polyols; (e) epoxy polyols; (f) polyhydric polyvinyl alcohols; (g) cellulose and derivatives thereof, (h) urethane polyols; and mixtures thereof.

(a) Thermoplastic acrylic polyols include but are not limited to the known thermoplastic, hydroxyl-functional addition polymers and copolymers of acrylic and methacrylic acids and their ester derivatives including but not limited to their hydroxyl-functional ester derivatives (e.g., the hydroxyalkyl acrylates and methacrylates), acrylamide and methacrylamide, and unsaturated nitriles such as acrylonitrile and methacrylonitrile. Additional examples of acrylic monomers which can be addition polymerized to form acrylic polyols include hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

(b) Thermoplastic polyester polyols are generally known and typically are prepared by conventional techniques involving reaction of polycarboxylic acids with simple diols, triols and higher hydric alcohols known in the art (optionally in combination with monohydric alcohols). Examples of the simple diols, triols and higher hydric alcohols include, but are not limited to: ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A) and 2 moles of propylene oxide available as DOW-565 from DOW Chemical Company; monoethanolamine; diethanolamine; triethanolamine; N-methyl-monoethanolamine; 2-hydroxymethyl-2-dimethylamino-1,3-propanediol; 2-hydroxymethyl-2-dimethylamino-1-propanol; and the like. Examples of polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxycaproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable.

Examples of the optional monohydric alcohols which may be used to prepare the thermoplastic polyester polyols include: ethanol, propanol, isopropanol, n-pentanol, neopentyl alcohol, 2-ethoxyethanol, 2-methoxyethanol, 1-hexanol, cyclohexanol, 2-methyl-2-hexanol, 2-ethylhexyl alcohol, 1-octanol, 2-octanol, 1-nonanol, 5-butyl-5-nonanol, isodecyl alcohol, and the like.

(c) Thermoplastic polyether polyols are generally known. Examples of such polyols include but are not limited to the poly-(oxyethylene) glycols and poly-(oxypropylene) glycols prepared by the acid or base catalyzed addition of ethylene oxide or propylene oxide to initiators such as water, ethylene glycol, propylene glycol, diethylene glycol and dipropylene glycol and by the copolymerization of ethylene oxide and propylene oxide with initiator compounds such as trimethylolpropane, glycerol, pentaerythritol, sorbitol, sucrose and the like. Examples of polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of polyether polyols include the generally known reaction products of 1,2-epoxide-containing compounds with polyols such as those included in the description of simple diols, triols, and higher hydric alcohols above.

(d) Thermoplastic amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-menthanediamine and the like.

(e) Thermoplastic epoxy polyols are generally known and can be prepared, for example, by the reaction of glycidyl ethers of polyphenols such as the diglycidyl ether of 2,2-bis (4-hydroxyphenyl) propane, with polyphenols such as 2,2-bis (4-hydroxyphenyl) propane.

Epoxy polyols of varying molecular weights and average hydroxyl functionality can be prepared depending upon the ratio of starting materials used.

(f) Thermoplastic polyhydric polyvinyl alcohols are generally known and can be prepared, for example, by the addition polymerization of vinyl acetate in the presence of suitable initiators followed by hydrolysis of at least a portion of the acetate moieties. In the hydrolysis process, hydroxyl groups are formed which are attached directly to the polymer backbone. In addition to homopolymers, copolymers of vinyl acetate and monomers such as vinyl chloride can be prepared and hydrolyzed in similar fashion to form polyhydric polyvinyl alcohol-polyvinyl chloride copolymers.

(g) Cellulose and derivatives thereof, which are thermoplastic and contain hydroxyl functionality, are generally known. Examples include: cellulose; cellulose acetate, cellulose propionate, cellulose butyrate, cellulose acetate butyrate, ethyl cellulose, hydroxyethyl cellulose, and mixtures thereof.

(h) Thermoplastic urethane polyols are generally known and can be prepared, for example, by reaction of an organic polyisocyanate with a polyol. The organic polyisocyanate may be aromatic, aliphatic, cycloaliphatic, or heterocyclic and may be unsubstituted or substituted with groups such as halogen, etc. Examples of polyisocyanates useful in the preparation of urethane polyols include but are not limited to: toluene-2,4-diisocyanate, toluene-2,6-diisocyanate, and mixtures thereof; diphenylmethane-4,4'-diisocyanate, diphenylmethane-2,4'-diisocyanate and mixtures thereof; para-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis(isocyanatoethyl)-fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the organic polyisocyanate. Moreover, isocyanate prepolymers may be utilized as the polyisocyanate. Isocyanate prepolymers refer to the reaction products of a polyol and polyisocyanate in which the polyol and polyisocyanate are reacted, by the generally known prepolymer technique, in relative proportions to produce an isocyanato-functional product, namely the isocyanate prepolymer. Also, mixtures of organic isocyanate prepolymers with monomeric isocyanates (so-called semi-prepolymers) may be utilized in the prepolymer technique. Examples of polyols useful in the preparation of urethane polyols include those described in subsections (a) through (g) above.

Of the polyols described above for preparation of basecoating compositions for the method of the invention, acrylic polyols and polyester polyols are preferred, acrylic polyols being more preferred.

The molecular weight of suitable thermoplastic film-forming polymers which may be utilized in the basecoating composition for the method of the invention can vary within wide limits depending on the nature of the specific classes of thermoplastic film-forming polymers selected. The equivalent weight of the polymers (based on the total groups which are co-reactive with anhydride moieties) suitable for the basecoating composition for the method of the invention can vary widely. However, typically the number average molecular weight, for example of suitable hydroxyl-containing thermoplastic polymers can range from 3000 to 50000, preferably from 5000 to 12000; and the equivalent weight can range from 100 to 5000, preferably from 200 to 2000. When an acrylic polyol is utilized, which is preferred, its peak molecular weight as determined by gel permeation chromatography utilizing a polystyrene standard is generally in the range of from about 3000 to about 50,000.

In the method of the invention, within 24 hours, preferably within 8 hours, prior to applying the pigmented basecoating composition to the substrate, a carboxylic acid anhydride component having at least two cyclic anhydride groups is mixed with the basecoating composition. The amount of the carboxylic acid anhydride component is selected so as to provide a ratio of equivalents of anhydride groups to equivalents of said co-reactive functional groups on the thermoplastic polymer of at least 0.10:1.00, preferably from 0.10:1.00 to 0.50:1.00. As used herein, each mole of anhydride groups (i.e., —CO—O—CO— moieties) should be considered to provide 1 equivalent of anhydride groups for reaction with the functional groups on the thermoplastic film-forming polymer which are co-reactive with the anhydride groups. Since the anhydride component is reactive with functional groups on the thermoplastic, film-forming polymer, the anhydride component normally is added to the basecoating composition at the time the basecoating composition is to be applied to the substrate according to the method of the invention. It has been found that a ratio of the aforesaid equivalents of at least 0.10:1.00 is needed to provide adequate repairability for the resulting composite film of the method of the invention. While, a ratio greater than the aforesaid stated ratio of 0.50:1.00 can be utilized, the addition of an amount of the anhydride component for such larger ratio can tend to "dilute" the composition to an extent that a disadvantageous change (dilution) in color of the pigmented, basecoating composition can occur.

The word, "thermoplastic," as used in the term, "thermoplastic film-forming polymer," is employed in the conventional sense of referring to a material which softens when heated below its decomposition temperature and returns to its normal condition when cooled to room temperature. Such materials are also known as "nonconvertible materials." Typically, but not always, thermoplastic film-forming polymers are solids at room temperature (about 25° C.) in the absence of solvents. However, it should be understood that certain low molecular weight thermoplastic materials are liquids at room temperature. However, the viscosity of such low molecular weight thermoplastic materials will decrease upon heating and return to the original value upon cooling back down to room temperature.

The carboxylic acid anhydride component for the basecoating composition in the method of the invention has at least two cyclic anhydride groups. The carboxylic acid anhydride component is added to the basecoating composition in an amount so as to provide a ratio of equivalents of anhydride groups to equivalents of the co-reactive functional groups of the thermoplastic film-forming polymer of at least 0.10:1.00. The carboxylic acid anhydride may be monomeric, oligomeric, or polymeric.

Examples of the carboxylic acid anhydrides include: isoprene disuccinyl anhydride, pyromellitic anhydride, and polymers containing at least two cyclic anhydride groups per molecule derived, for example, by reaction of ethylenically unsaturated carboxylic acid anhydrides, such as maleic anhydride, citraconic anhydride and itaconic anhydride, maleic anhydride being preferred, with for example, vinyl monomers and/or acrylic monomers. Preferred carboxylic acid anhydride components for the basecoating composition in the method of the invention are derived from a mixture of monomers comprising an ethylenically unsaturated carboxylic acid anhydride and at least one vinyl comonomer, preferably styrene. Examples of vinyl monomers include: styrene, alpha-methylstyrene, vinyl toluene, vinyl acetate and vinyl chloride. Aromatic vinyl monomers are preferred, styrene being particularly preferred. Acrylic monomers refer to compounds such as acrylic acid and methacrylic acid and their ester derivatives, acrylamide and methacrylamide, and unsaturated nitriles such as acrylonitrile and methacrylonitrile. Examples of acrylic monomers include: hydroxyethyl (meth)acrylate, hydroxypropyl (meth)acrylate, methyl (meth)acrylate, ethyl (meth)acrylate, propyl (meth)acrylate, isopropyl (meth)acrylate, butyl (meth)acrylate, t-butyl (meth)acrylate, 2-ethylhexyl (meth)acrylate, n-hexyl (meth)acrylate, cyclohexyl (meth)acrylate, 3,3,5-trimethylcyclohexyl (meth)acrylate, decyl (meth)acrylate, isodecyl (meth)acrylate, lauryl (meth)acrylate, stearyl (meth)acrylate, phenyl (meth)acrylate, and isobornyl (meth)acrylate.

Additional examples of carboxylic acid anhydrides include: anhydride adducts of diene polymers such as maleinized polybutadiene or maleinized copolymers of butadiene, for example butadiene/styrene copolymers; as well as anhydride adducts of unsaturated fatty acid esters, for example, styrene/allyl alcohol copolymers esterified with unsaturated fatty acids and maleinized.

The basecoating composition for the method of the invention contains opaque pigments and, optionally, transparent or translucent pigments generally known for use in coating compositions. Suitable pigments including metallic flake pigments and various uncolored, white, and colored pigments may be utilized as well as dyes.

As discussed above, the method of the invention involves coating the basecoat with one or more applications of a transparent, crosslinking, topcoating composition comprising a crosslinkable, film-forming material and a crosslinking agent for the crosslinkable, film-forming material to form a transparent topcoat over the basecoat. The transparent topcoating composition should be essentially or completely free of opaque pigments; that is, it should not contain opaque pigmentation that would interfere with the production of a transparent film from the topcoating composition. The transparent, crosslinking, topcoating composition may be based on any crosslinkable, film-forming material which is not incompatible for use over the basecoat formed from the aforesaid basecoating composition. For example, when the topcoating composition is to be applied to an organic solvent-borne basecoat before a substantial amount of hardening of the basecoating composition has occurred, it probably would be disadvantageous to utilize a water-borne topcoating composition for the transparent topcoat. Any suitable crosslinking, topcoating composition is within contemplation of the method of the present invention. In other words, the use of any topcoating composition, the hardening of which involves a crosslinking mechanism (curing mechanism) which occurs at ambient temperature or at elevated temperature, is considered to be within the scope of the method of the present invention.

In a preferred embodiment of the method of the invention, the crosslinkable, film-forming material of the topcoating composition comprises (A) a hydroxy component having at least two free hydroxyl groups per molecule and (B) an anhydride component having at least two carboxylic acid anhydride groups per molecule. The preferred topcoating composition can be cured by heating or without heating, typically at ambient temperature. Once the hydroxy component (A) and the anhydride component (B) of the topcoating composition are brought in contact with each other, usually in the presence of a catalytic agent, the topcoating composition will begin to cure. Accordingly, it is desirable in some instances to prepare the preferred topcoating composition in the form of a two package system, i.e., one package containing the hydroxy component, often along with the aforesaid catalytic agent, and a second package containing the anhydride component. At the time of application, the two packages simply are mixed together to form the resulting liquid topcoating composition. U.S. Pat. No. 4,452,948, the disclosure of which is hereby incorporated by reference, describes certain coating compositions comprising a hydroxy component, an anhydride component and an amine catalyst which may be utilized in the method of the present invention. However, in the present invention, it is more preferred that the anhydride component for the topcoating composition be derived from a mixture of monomers comprising greater than or equal to 11 percent by weight, preferably at least 15 percent by weight, of an ethylenically unsaturated carboxylic acid anhydride the balance of the mixture comprised of at least one vinyl comonomer, preferably comprising styrene. This level of ethylenically unsaturated carboxylic acid anhydride is utilized to provide sufficient crosslinking capability in the topcoating composition to make a product film having good durability properties. However, at this level, and higher levels, of anhydride content, there is a problem of yellowing of the topcoating composition upon admixture of the components in the presence of an amine catalyst. In a particularly preferred embodiment, the molar ratio of the vinyl comonomer to the carboxylic acid anhydride in the aforesaid mixture is adjusted to minimize yellowing of the composition upon mixing of the components. In this embodiment, the molar ratio of the vinyl comonomer to the carboxylic acid anhydride in component (B) of the topcoating composition is at least 1.0:1.0 and sufficient to provide a color standard number of less than 150 according to ANSI/ASTM test method D 1209-69 when an amount of components (A) and (B) of the topcoating composition sufficient to provide 27 grams of solids of the components is mixed with 1.0 gram of dimethylcocoamaine and reduced with butyl acetate to a solids content of 22.5 percent by weight. It has been found that when the molar ratio of the vinyl comonomer to the carboxylic acid anhydride in the aforesaid mixture is at least 1.3:1.0, admixture of the anhydride component with the hydroxy component in the presence of an amine catalyst typically will result in the product topcoating composition being essentially free, or free, of yellowing. Typically the preferred topcoating composition for utilization in the method of the present invention can be cured to a tack free film at a temperature of less than 75 degrees Celsius within 4 hours, preferably at ambient temperature.

The hydroxy component (A) for a topcoating composition for the preferred method typically comprises a film-forming polymer. However, a hydroxy component which is not polymeric may be utilized. However, the combination of the anhydride component with the hydroxy component should result in a film-forming system. Examples of hydroxy components for the preferred topcoating compositions include but are not limited to those in the following classes which are well known in the art: simple diols, triols and higher hydric alcohols also including those having additional functional groups such as the various aminoalcohols; acrylic polyols; polyester polyols; polyether polyols; amide-containing polyols; epoxy polyols; polyhydric polyvinyl alcohols; cellulose and derivatives thereof urethane polyols; and mixtures thereof. The simple diols, triols, and higher hydric alcohols are generally known, examples of which include but are not limited to: ethylene glycol; propylene glycol; 1,2-butanediol; 1,4-butanediol; 1,3-butanediol; 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis(hydroxymethyl)cyclohexane; 1,2-bis(hydroxyethyl)cyclohexane; 2,2-dimethyl-3-hydroxypropyl-2,2-dimethyl-3-hydroxypropionate; diethylene glycol; dipropylene glycol; bis hydroxypropyl hydantoins; tris hydroxyethyl isocyanurate; the alkoxylation product of 1 mole of 2,2-bis(4-hydroxyphenyl)propane (i.e., bisphenol-A) and 2 moles of propylene oxide available as DOW-565 from DOW Chemical Company; monoethanolamine; diethanolamine; triethanolamine; N-methyl-monoethanolamine; 2-hydroxymethyl-2-dimethylamino-1,3-propanediol; 2-hydroxymethyl-2-dimethylamino-1-propanol; and the like. Examples of acrylic polyols, polyester polyols, polyether polyols, amide-containing polyols, epoxy polyols, polyhydric polyvinyl alcohols, cellulose and derivatives thereof which contain hydroxyl functionality, and urethane polyols suitable as the hydroxy component for the preferred topcoating composition for the method of the invention include, but are not limited to, those discussed above in the description of hydroxl-containing polymers for utilization in the basecoating composition. Additional examples of the hydroxy component include: graft copolymers of acrylic monomers including hydroxyalkyl acrylates and methacrylates onto unsaturated polyesters; and copolymers of allyl alcohol, for example styrene/allyl alcohol copolymers optionally containing allyl ether units.

Of the polyols set forth above for utilization as the hydroxy component of the preferred transparent topcoating compositions for the method of the invention, acrylic polyols and polyhydroxyl-functional esters are preferred, acrylic polyols being more preferred. The term "polyhydroxyl-functional esters" is intended to include both oligomeric ester polyols such as 2,2-dimethyl-3-hydroxypropyl-2,2-dimethyl-3-hydroxypropionate and polyester polyols described above.

The molecular weight of suitable organic polyols for utilization as the hydroxy component for the preferred topcoating compositions can vary within wide limits depending on the nature of the specific classes of polyols selected. Also, the hydroxyl equivalent weight of organic polyols suitable as the hydroxy component for the preferred topcoating compositions of the invention can vary widely. However, typically the number average molecular weight of suitable organic polyols can range from 62 to 50,000, preferably from 1,000 to 20,000; and the hydroxyl equivalent weight can range from 31 to 25,000, preferably from 500 to 10,000. When an acrylic polyol is utilized, which is particularly preferred, its peak molecular weight as determined by gel permeation chromatography utilizing a polystyrene standard is generally in the range of from about 1,000 to about 50,000.

As discussed above, the anhydride component for the preferred topcoating compositions has at least two carboxylic acid anhydride groups per molecule and is derived from a mixture of monomers comprising an ethylenically unsaturated carboxylic acid anhydride and at least one vinyl comonomer. As used herein, the term "vinyl comonomer" or "vinyl monomer" is intended to include vinyl monomers such as styrene, alpha-methylstyrene, vinyl toluene, vinyl acetate and vinyl chloride, and is not intended to include acrylic monomers such as acrylic and methacrylic acids and their ester derivatives, examples of which can be found above in the description of the acrylic polyols. Aromatic vinyl monomers are preferred, styrene being particularly preferred. Acrylic monomers can be utilized in the aforesaid mixture of monomers comprising the ethylenically unsaturated carboxylic acid anhydride, but are not to be included within the meaning of the term "vinyl comonomer" or "vinyl monomer." Examples of ethylenically unsaturated carboxylic acid anhydrides for the preferred topcoating compositions include: maleic anhydride, citraconic anhydride and itaconic anhydride, maleic anhydride being preferred. For an anhydride component which is a film-forming polymer, the peak molecular weight as determined by gel permeation chromatography utilizing a polystyrene standard generally is in the range of about 1,000 to about 50,000.

The anhydride component for the preferred topcoating composition can alternatively be an anhydride adduct of a diene polymer such as maleinized polybutadiene or a maleinized copolymer of butadiene, for example a butadiene/styrene copolymer. An anhydride adduct of an unsaturated fatty acid ester, for example a styrene/allyl alcohol copolymer esterified with an unsaturated fatty acid and maleinized, may also be used.

Typically, the preferred topcoating composition for the method of the invention additionally comprises an effective amount of a catalytic agent for accelerating the curing reaction between hydroxyl groups of the hydroxy component (A) and anhydride groups of the anhydride component (B) of the topcoating composition. Most often, the catalytic agent comprises an amino group, preferably a tertiary amino group. The amino group may be present in the molecule of the hydroxy component (A) or in a separate amine compoun such as, for example, dimethyl cocoamine, triethylamine, triethanolamine and phenolic compounds containing at least two dialkyl-amino groups. Typically, the amino group is in a separate amine compound. Usually, the amino group-containing catalytic agent is incorporated in the hydroxy component (A) of the topcoating composition as a separate amine compound. However, one or more amino groups may be incorporated in the hydroxy component as pendant groups in a hydroxyl-containing copolymer, for example, an acrylic polyol prepared utilizing a dialkyl-amino-alkyl acrylate or methacrylate such as dimethylaminoethyl acrylate, diethylaminoethyl acrylate, dimethylaminoethyl methacrylate and diethylaminoethyl methacrylate, or a dialkyl-amino-alkyl-substituted amide such as dimethylaminopropyl methacrylamide. Although less preferred, a secondary amine such as t-butylaminoethyl methacrylate may also be used. Alternatively, tertiary amine groups can be introduced into an acrylic polyol by copolymerizing glycidyl acrylate or methacrylate with other appropriate unsaturated comonomers and subsequently reacting the glycidyl groups with a secondary amine.

The hydroxy component (A) for use in the preferred topcoating composition may be a mixture of a polymer containing hydroxyl but not amine groups with a polymer or compound containing hydroxyl and amine groups or the amine catalyst may be a separate amine compound not containing hydroxyl groups.

Generally the amounts of hydroxy component (A) and anhydride component (B) in the preferred topcoating composition are selected to provide a ratio of equivalents of hydroxyl groups to equivalents of anhydride groups in a range of from 3:1 to 1:3. Typically the hydroxyl component and anhydride component are utilized to provide a ratio of equivalents of hydroxyl groups to equivalents of anhydride groups of 1:1.

The components of the topcoating composition generally are incorporated in an organic solvent and/or diluent in which the materials employed are compatible and soluble to the desired extent. Organic solvents which may be utilized include, for example, alcohols, ketones, aromatic hydrocarbons, esters or mixtures thereof. Illustrative of organic solvents of the above type which may be employed are alcohols such as ethanol, propanol, isopropanol, and butanol; ether alcohols such as ethylene glycol monoethyl ether, ethylene glycol monobutyl ether, propylene glycol monomethyl ether, and dipropylene glycol monoethyl ether; ketones such as methyl ethyl ketone, methyl N-butyl ketone, and methyl isobutyl ketone; esters such as butyl acetate; and aromatic hydrocarbons such as xylene, toluene, and naphtha.

In addition to the foregoing components, the topcoating composition may contain one or more optional ingredients of the type ordinarily utilized in coatings of this general class. Examples of such ingredients include: various fillers; plasticizers; antioxidants; mildewcides and fungicides; surfactants; various flow control agents including, for example, thixotropes and additives for sag resistance based on polymer microparticles (sometimes referred to as microgels); and other such formulating additivess.

The basecoating and/or topcoating compositions for the "color plus clear" method of the invention may be applied to a substrate by any conventional method such as brushing, dipping, flow coating, roll coating, and spraying. Typically they are most often applied by spraying. Usually the topcoating composition is applied over the basecoat before the basecoat has substantially dried or hardened. The method is applicable to a wide variety of substrates such as wood, metals, glass, cloth, plastics, foams and the like, as well as over primers. The method has utility in general coating applications and can also be useful in specialty applications such as for automotive vehicle finishing and refinishing applications. The method of the invention has been found to be especially suitable for automotive refinishing applications because of the ability to utilize low temperature hardening as well the ability to provide excellent appearance and durability properties in the resultant composite films.

The "color plus clear" method of the present invention while employing a non-crosslinked, thermoplastic film-forming polymer in the basecoating composition and a crosslinking, film-forming material in the topcoating composition, nevertheless results in a hardened composite film which has excellent repairability characteristics as can be appreciated from the following examples. The method of the invention also provides composite films having better metal flake orientation (pattern control) when metallic pigments are utilized in the basecoating composition, as well as good heat resistance, and excellent solvent resistance.

The following examples illustrate the invention and should not be construed as a limitation on the scope thereof. Unless specifically indicated otherwise, all percentages and amounts are understood to be by weight. The following terms and abbreviations wherever used in the specification and claims have the meanings set forth below.

"PBW" means parts by weight.

"BC" means basecoat and "CC" means clearcoat.

"DFT" means dry film thickness in mils.

"Repair" means that after 24 hours the composite film is sanded down to the steel substrate forming a bare area of metal surrounded by a feather-edge of film. The area to be repaired is rinsed with water to remove the powdery material and dried. Next the area to be repaired is wiped with a tar and wax remover available as DX-330 from PPG INDUSTRIES, INC., PPG FINISHES. Next the basecoating composition is spray applied to the area to be repaired and observed for any wrinkling or lifting in the feather-edge area. A rating of "pass" means that there was no noticeable wrinkling or lifting in the feather-edge area.

EXAMPLE 1

This example illustrates the preparation of an anhydride component from an ethylenically unsaturated carboxylic acid anhydride for utilization in the basecoating compositions of Examples 3, 4 and 5 and the clearcoating compositions of Examples 2, 3, 4, 5 and 6. The following monomers are used to make the anhydride component:

| | Percent by Weight |
|---|---|
| Styrene | 46.8 |
| Maleic anhydride | 22.0 |
| Butyl acrylate | 15.6 |
| Methyl methacrylate | 15.6 |

A reaction vessel equipped with stirrer, thermometer, condenser and addition funnels is charged with 93.5 PBW of ethyl-3-ethoxy propionate (EktaPro EEP from Eastman Chemical Products) and 72.5 PBW of butyl acetate and heated to reflux, about 142 degrees Celsius (° C.). Two feeds, identified herein as A and B, are next gradually and simultaneously added to the vessel over a period of three hours while the contents of the vessel are maintained at reflux conditions. Feed A consists of a mixture of 234.0 PBW styrene, 110.0 PBW maleic anhydride, 78.0 PBW butyl acrylate, 78.0 PBW methyl methacrylate, 93.8 PBW ethyl-3-ethoxy propionate and 72.5 PBW butyl acetate. Feed B consists of a mixture of 80.0 PBW of a 50 percent by weight solution of tertiary-butyl peroctoate in mineral spirits (LUPERSOL PMS from Pennwalt Corp.) and 34.2 PBW ethyl-3-ethoxy propionate. After the addition of the two feeds A and B is complete, the contents of the vessel are allowed to reflux for 1 hour after which a mixture of 5.0 PBW LUPERSOL PMS and 26.6 PBW of ethyl-3-ethoxy propionate is added to the vessel over a period of ½ hour followed by reflux for an additional 2 hours. Thereafter, heating is discontinued, 21.7 PBW butyl acetate is added to the vessel, and the contents of the vessel are allowed to cool to ambient temperature.

The resultant product contains a film-forming polymer derived from an ethylenically unsaturated carboxylic acid anhydride; has a total solids content measured for 1 hour at 110° C. of 57.1 percent by weight; has residual contents of methyl methacrylate, styrene, butyl acrylate, and maleic anhydride, respectively, of 0.37%, 0.11%, 0.13% and less than 0.01% by weight; has a peak molecular weight of 6116, a weight average molecular weight of 7595 and a number average molecular weight of 3090 as determined by gel permeation chromatography utilizing a polystyrene standard; has an acid value of 64.5; and has a color standard number of 80.

EXAMPLE 2

This example illustrates the preparation of a two-package, clear topcoating composition (or clearcoating composition) for utilization in the method of the invention and in a comparative method.

(a) A composition containing a hydroxyl-functional acrylic resin is prepared by mixing the ingredients as set forth in the following Table 1. The resultant composition is identified as composition ACR-1.

TABLE 1

| Acrylic Composition | Mass (grams) ACR-1 |
|---|---|
| Acrylic resin-1[1] | 104.2 |
| Polysiloxane solution[2] | 1.0 |
| UV absorber[3] | 3.0 |
| Polybutylacrylate[4] | 3.0 |
| Flow control agent[5] | 0.3 |
| Butyl acetate | 59.5 |
| Dimethyl cocoamine[6] | 3.0 |
| Total mass | 172.3 |
| Total Solids | 69.3 |

[1]A solution of a hydroxyl-functional acrylic polymer having a peak molecular weight of 13500, a weight average molecular weight of 19000 and a number average molecular weight of 5592 (as determined by gel permeation chromatography using a polystyrene standard) made from 10.0% 2-hydroxyethyl acrylate, 14.8% TONE M-100 (an adduct of 1 mole of 2-hydroxyethyl acrylate with 2 moles of epsilon-caprolactone, obtained from Union Carbide), 14.1% styrene, 45.9% methyl methacrylate and 15.2% lauryl methacrylate at 60% by weight total solids (measured at 150° C. for 2 hours) in butyl acetate.
[2]The polysiloxane is available from DOW Corning Corporation as DC 200, 135 csk. Dissolved in xylene to give a 0.5 percent polysiloxane content.
[3]Available from Ciba-Geigy Corp. as TINUVIN 328.
[4]A 56% by weight solution of polybutylacrylate in xylene available from Ford Motor Company as CH-5967-S2.
[5]Available as BYK 300 from BYK Mallinekrodt Chem. Produkte GmbH.
[6]ARMEEN DM12D from ARMAK Chemical Division, Arzona Inc.

(b) A composition based on a polycarboxylic acid anhydride polymer (alternatively referred to as the "anhydride composition") is prepared by mixing the ingredients as set forth in the following Table 2. The resultant composition is identified as composition ANH-1.

TABLE 2

| Anhydride Composition | Mass (grams) ANH-1 |
|---|---|
| Product of Example 1 | 75.0 |
| Butyl acetate | 7.3 |
| Xylene | 6.9 |
| Thinner[1] | 75.0 |
| Total mass | 164.2 |
| Solids | 26.0% |

[1]A mixture of 16.3 pbw lactol spirits, 12.1 pbw toluene, 8.8 pbw VM&P naphtha, 11.0 pbw butyl acetate, 7.2 pbw ethyl-3-ethoxy propionate and 19.6 pbw heptyl acetate (available as Exxate 700 from EXXON).

(c) A two-package clear topcoating composition (or clearcoating composition) is prepared by mixing the ingredients as set forth in the following Table 3. The resultant clearcoating composition is identified as composition CC-1.

TABLE 3

| Clearcoating Composition | Mass (grams) CC-1 |
|---|---|
| ACR-1 | 172.3 |
| ANH-1 | 164.2 |
| Total Mass | 336.5 |
| Total Solids | 28.3% |

EXAMPLE 3

This example illustrates the application, curing and resultant repair properties of a coating applied via a "color plus clear" method of the invention in which the clearcoating composition of Example 2 (i.e., CC-1) is applied to a pigmented basecoating composition (to which an anhydride has been added) to form a resultant composite coating which is allowed to dry and cure at ambient atmospheric conditions and is designated herein as CC-1'. The example also illustrates a comparative "color plus clear" method utilizing the same compositions, except no anhydride has been added to the basecoating composition, to form a comparative composite coating which is designated herein as CC-1".

The pigmented basecoating composition contains the ingredients as set forth in the following Table 4.

TABLE 4

| Component | PBW |
|---|---|
| Acrylic Polyol[1] | 38.3 |
| Amino-functional acrylic resin[2] | 17.5 |
| Butyl benzyl phthalate | 1.6 |
| Cellulose acetate butyrate[3] | 2.4 |
| Wax[4] | 6.6 |
| Flow control agent[5] | 0.2 |
| Dibutyltin diacetate | 0.1 |
| Polysiloxane solution[6] | 0.5 |
| UV absorber[7] | 0.4 |
| Butyl acetate | 12.3 |
| Toluene | 1.2 |
| Propyleneglycol monomethylether acetate | 5.4 |
| Xylene | 4.2 |
| Methylethyl ketone | 4.2 |
| Organoclay[8] | 0.2 |
| Aluminum flake pigment | 4.8 |
| Phthalo blue | 0.1 |

TABLE 4-continued

| Component | | PBW |
|---|---|---|
| | Total | 100.0 |

[1]An acrylic polyol made from 30 percent by weight methyl methacrylate, 25 percent by weight styrene, 19 percent by weight butyl methacrylate, 12 percent by weight 2-ethylhexyl acrylate and 14 percent by weight hydroxyethyl acrylate using di-tertiary butyl peroxide as initiator and tertiary-docecyl mercaptan as chain transfer agent at 59 percent by weight solids (measured at 150 deg C. for 2 hours) in a mixture of solvents containing 75 percent by weight butyl acetate, 15 percent by weight VM&P naphtha and 10 percent by weight toluene. The acrylic polyol has a peak molecular weight of about 18,000, a number average molecular weight of about 10,000 and and a weight average molecular weight of about 22,000 determined using gel permeation chromatography utilizing a polystyrene standard and tetrahydrofuran as the carrier solvent; and has a hydroxyl value of 828 on resin solids.

[2]An amino-functional acrylic resin made from 80 percent by weight methyl methacrylate and 20 percent by weight t-butylaminoethyl methacrylate at 35 percent by weight solids (measured at 150 deg C. for 2 hours) in a mixture of solvents containing 12.6 percent by weight isopropanol, 20.9 percent by weight acetone, 21.5 percent by weight toluene, 27.7 percent by weight ethyl acetate and 17.4 percent by weight butyl acetate. The acrylic resin has a peak molecular weight of about 95,000, a weight average molecular weight of about 92,000 and a number average molecular weight of about 39,000 as determined by gel permeation chromatography utilizing a polystyrene standard and dimethyl formamide as the carrier solvent.

[3]Cellulose acetate butyrate available as CAB 531-1 from Eastman Chemical Company.

[4]A wax available as MPA 2000T from NL Industries, Inc.

[5]Available as BYKP-1045 from BYK Malinekrodt Chem. Produkte GmbH

[6]The polysiloxane is available from DOW Corning Corporation as DC 200, 135 csk. Dissolved in xylene to give a 0.5 percent polysiloxane content.

[7]Available from Ciba-Geigy Corp. as TINUVIN 328.

[8]Available as BENTONE 34 from N.L. Industries, Inc.

Each basecoating composition is reduced 150 percent by volume with a lacquer thinner available as DT 170 from PPG INDUSTRIES, INC., PPG FINISHES, (i.e., 1 part by volume basecoating composition to 1.5 parts by volume lacquer thinner). To one of the resulting compositions is added 0.25 parts by volume of anhydride composition, ANH-1 of Table 2 above, just before spraying. No anhydride is added to the other composition (i.e., the comparative basecoating composition). The basecoating compositions are spray applied to 24 gauge cold rolled steel panels (treated with BONDERITE 40 and primed with DP-40/401, a two component epoxy primer from PPG INDUSTRIES, INC., PPG FINISHES reduced 100% by volume with DTU 800, a thinner from PPG INDUSTRIES, INC., PPG FINISHES) to form the basecoats.

The basecoats are allowed to flash for 30 to 45 minutes at room temperature. Immediately thereafter, the clearcoating composition of Table 3 is spray applied to the basecoats to form clear topcoats (clearcoats). The composite basecoat/clearcoat films are allowed to cure at ambient atmospheric conditions.

The resultant repairability properties for the hardened composite films are as set forth in the following Table 5. The repair was made 24 hours after application of the coating compositions to the substrate.

TABLE 5

| Composite Film | DFT BC/CC | Repair 24 Hr |
|---|---|---|
| BC/CC-1′ | 0.7/2.1 | Pass (No lifting) |
| BC/CC-1″ | 0.7/2.1 | Fail (Lifting) |

EXAMPLE 4

This is a comparative example of a "color plus clear" coating system in which the thermoplastic, film-forming polymer of the basecoating composition has no functional groups which are co-reactive with acid anhydride moieties.

The basecoating composition for this comparative example contains the following components in percent by weight based on the total basecoating composition: 53.5 percent acrylic polymer (made from 90 percent by weight methyl methacrylate and 10 percent by weight lauryl methacrylate at about 30 percent by weight solids in a solvent mixture containing 27 by weight methylethyl ketone and 73 percent by weight toluene; and having a peak molecular weight of about 60,000, a number average molecular weight of about 32,000 and a weight average molecular weight of about 77,0000), 6.7 percent butyl benzyl phthalate, 8.4 percent nitrocellulose solution (available as Solution A5557 from Scholle Corp.), 5 percent pigments, with the remainder comprising additional solvents.

Each basecoating composition is reduced 150 percent by volume with a lacquer thinner available as DT 170 from PPG INDUSTRIES, INC., PPG FINISHES, (i.e., 1 part by volume basecoating composition to 1.5 parts by volume lacquer thinner). To one of the resulting compositions is added 0.25 parts by volume of anhydride composition, ANH-1 of Table 2 above, just before spraying. No anhydride is added to the other composition (i.e., the comparative basecoating composition). The basecoating compositions are spray applied to 24 gauge cold rolled steel panels (treated with BONDERITE 40 and primed with DP-40/401, a two component epoxy primer from PPG INDUSTRIES, INC., PPG FINISHES reduced 100% by volume with DTU 800, a thinner from PPG INDUSTRIES, INC., PPG FINISHES) to form the basecoats.

The basecoats are allowed to flash for ½ hour at room temperature. Immediately thereafter, the clearcoating composition of Table 3 is spray applied to the basecoats to form clear topcoats (clearcoats). The composite basecoat/clearcoat films are allowed to cure at ambient atmospheric conditions.

The resultant repairability properties for the hardened composite films are as set forth in the following Table 6. The composite film prepared from the basecoating composition to which the anhydride was added is designated BC/CC-2′ in Table 6 and that to which no anhydride was added is designated CC-2″

TABLE 6

| Composite Film | DFT BC/CC | Repair 24 Hr |
|---|---|---|
| BC/CC-2′ | 1.7/2.1 | Fail (Lifting) |
| BC/CC-2″ | 1.7/2.1 | Fail (Lifting) |

EXAMPLE 5

This example illustrates the application, curing and resultant repair properties of a coating applied via a "color plus clear" method of the invention in which the clearcoating composition of Example 2 (i.e., CC-1) is applied to a pigmented, thermoplastic acrylic-containing basecoating composition (to which an anhydride has been added) to form a resultant composite coating which is allowed to dry and cure at ambient atmospheric conditions and is designated herein as CC-3′. The example also illustrates a comparative "color plus clear" method utilizing the same compositions, except no anhydride has been added to the basecoating composition, to form a comparative composite coating which is designated herein as CC-3″.

Each of two pigmented basecoating compositions consists of a composition made by mixing 1 part by volume of CRONAR BASECOLOR B8633JX (a silver metallic composition comprising an acrylic resin, pigment, amyl acetate, butyl acetate, xylene and also believed to contain cellulose acetate butyrate; available from E.I. Du Pont de Nemours and Company; determined to have a hydroxyl value of 55 based on a dried sample of the composition) with 1 part by volume of CRONAR BASEMAKER 9365 S (available from E.I. Du Pont de Nemours and Company and believed to contain primarily a mixture of solvents). To one of the pigmented basecoating compositions is added 0.25 parts by volume of anhydride composition, ANH-1 of Table 2 above, just before spraying. No anhydride is added to the other basecoating composition (i.e., the comparative basecoating composition).

The basecoating compositions are spray applied to 24 gauge cold rolled steel panels (treated with BONDERITE 40 and primed with DP-40/401, a two component epoxy primer from PPG INDUSTRIES, INC., PPG FINISHES reduced 100% by volume with DTU 800, a thinner from PPG INDUSTRIES, INC., PPG FINISHES) to form the basecoats.

The basecoats are allowed to flash for 90 minutes at room temperature. Immediately thereafter, a clearcoating composition made by mixing together 4 parts by volume of CRONAR POLYOXITHANE CLEAR 9500 S (from E.I. Du Pont; and determined to contain amino functionality in an amount of 0.25 amine equivalents), 1 part by volume of CRONAR POLYOXITANE CLEAR INITIATOR 9504 S (from E.I. Du Pont and determined by infrared analysis to contain about 65 percent by weight of glycidyl groups) and 1 part by volume of CRONAR POLYOXITHANE MID-TEMP CATALYTIC REDUCER 9585 S (from E.I. Du Pont and comprising 2-ethoxypropyl ether, 1-methoxypropanol acetate, aromatic hydrocarbons and methyl t-hydroxybenzoate) is spray applied to the basecoats to form clear topcoats (clearcoats). The composite basecoat/clearcoat films are allowed to cure at ambient atmospheric conditions.

The resultant repairability properties for the hardened composite films are as set forth in the following Table 7. The repair was made 24 hours after application of the coating compositions to the substrate.

TABLE 7

| Composite Film | DFT BC/CC | Repair 24 Hr |
|---|---|---|
| BC/CC-3′ | 0.5/2.6 | Pass (No lifting) |
| BC/CC-3″ | 0.5/2.6 | Fail (Lifting) |

EXAMPLE 6

This example illustrates the application, curing and resultant repair properties of a coating applied via a "color plus clear" method of the invention in which the clearcoating composition of Example 2 (i.e., CC-1) is applied to a pigmented, thermoplastic acrylic-containing basecoating composition (to which a monomeric dianhydride has been added) to form a resultant composite coating which is allowed to dry and cure at ambient atmospheric conditions and is designated herein as CC-4′. The example also illustrates a comparative "color plus clear" method utilizing the same compositions, except no anhydride has been added to the basecoating composition, to form a comparative composite coating which is designated herein as CC-4″.

Each of two pigmented basecoating compositions consists of a composition made by mixing 1 part by volume of CRONAR BASECOLOR 99JX (a black composition comprising an acrylic resin, pigment, amyl acetate, butyl acetate, xylene and also believed to contain cellulose acetate butyrate; available from E.I. Du Pont de Nemours and Company) with 1 part by volume of CRONAR BASEMAKER 9365 S (available from E.I. Du Pont de Nemours and Company and believed to contain primarily a mixture of solvents). To 150 milliliters of one of the pigmented basecoating compositions is added 7 milliliters of a solution of 45 grams of isoprene disuccinyl anhydride in 45 grams of acetone, just before spraying. No anhydride is added to the other basecoating composition (i.e., the comparative basecoating composition).

The basecoating compositions are spray applied to 24 gauge cold rolled steel panels (treated with BONDERITE 40 and primed with DP-40/401, a two component epoxy primer from PPG INDUSTRIES, INC., PPG FINISHES reduced 100% by volume with DTU 800, a thinner from PPG INDUSTRIES, INC., PPG FINISHES) to form the basecoats.

The basecoats are allowed to flash for 20 minutes at room temperature. Immediately thereafter, the clearcoating composition of Table 3 is spray applied to the basecoats to form clear topcoats (clearcoats). The composite basecoat/clearcoat films are allowed to cure at ambient atmospheric conditions.

The resultant repairability properties for the hardened composite films are as set forth in the following Table 8. The repair was made 24 hours after application of the coating compositions to the substrate.

TABLE 8

| Composite Film | DFT BC/CC | Repair 24 Hr |
|---|---|---|
| BC/CC-4′ | 0.87/2.1 | Pass (No lifting) |
| BC/cc-4″ | 0.87/2.1 | Fail (Lifting) |

What is claimed is:

1. A method of coating comprising the steps of:

(I) coating a substrate with one or more applications of a pigmented basecoating composition comprising a thermoplastic, non-crosslinked, film-forming polymer having at least two functional groups per molecule which functional groups are co-reactive with acid anhydride moieties, to which basecoating composition has been added within 24 hours prior to coating said substrate, a carboxylic acid anhydride component having at least two cyclic anhydride groups in an amount so as to provide a ratio of equivalents of anhydride groups to equivalents of said co-reactive functional groups of at least 0.10:1.00 to form a basecoat; and (II) coating said basecoat with one or more applications of a transparent, crosslinking topcoating composition comprising a crosslinkable, film-forming material and a crosslinking agent for said crosslinkable, film-forming material to form a transparent topcoat.

2. The method of claim 1 wherein said ratio of equivalents of anhydride groups to equivalents of said co-reactive functional groups is in the range of from 0.10:1.00 to 0.50:1.00.

3. The method of claim 2 wherein said functional groups comprise hydroxyl groups.

4. The method of claim 1 wherein said carboxylic acid anhydride component of said basecoating composition is added to said basecoating composition within 8 hours prior to coating said substrate.

5. The method of claim 4 wherein said thermoplastic, non-crosslinked, film-forming polymer is an acrylic polymer having at least two hydroxyl groups per molecule.

6. The method of claim 1 wherein said basecoat and said topcoat are allowed to harden together on said substrate under ambient atmospheric conditions.

7. The method of claim 1 wherein said carboxylic acid anhydride component of said basecoating composition is derived from a mixture of monomers comprising an ethylenically unsaturated carboxylic acid anhydride and at least one vinyl comonomer.

8. The method of claim 7 wherein said vinyl comonomer comprises styrene.

9. The method of claim 1 wherein said crosslinkable, film-forming material of said topcoating composition comprises (A) a hydroxy component having at least two free hydroxyl groups per molecule and (B) an anhydride component having at least two carboxylic acid anhydride groups per molecule derived from a mixture of monomers comprising greater than or equal to 11 percent by weight of an ethylenically unsaturated carboxylic acid anhydride the balance of said mixture comprised of at least one vinyl comonomer.

10. The method of claim 9 wherein the molar ratio of said vinyl comonomer to said carboxylic acid anhydride in component (B) of said topcoating composition is at least 1.0:1.0 and sufficient to provide a color standard number of less than 150 according to ANSI/ASTM test method D 1209-69 when an amount of components (A) and (B) sufficient to provide 27 grams of solids of said components is mixed with 1.0 gram of dimethylcocoamaine and reduced with butyl acetate to a solids content of 22.5 percent by weight.

11. The method of claim 10 wherein said vinyl comonomer in respect to said molar ratio comprises styrene.

12. The method of claim 10 wherein the molar ratio of said vinyl comonomer to said carboxylic acid anhydride in component (B) of said topcoating composition is at least 1.3:1.0.

13. The method of claim 9 wherein said topcoating composition is in the form of a two package composition in which said hydroxy component is in a package separate from said anhydride component.

14. The method of claim 9 in which said topcoating composition is essentially free of opaque pigments.

15. The method of claim 9 in which said topcoating composition additionally comprises (C) an effective amount of a catalytic agent containing an amino group for accelerating the curing reaction between hydroxyl groups of component (A) and anhydride groups of component (B) of said topcoating composition.

16. The method of claim 9 wherein said hydroxy component of said topcoating composition is selected from the group consisting of simple diols, triols and higher hydric alcohols; an acrylic polyol; a polyester polyol; cellulose and derivatives thereof; a urethane polyol; a polyether polyol; an amide-containing polyol; an epoxy polyol; and a mixture thereof.

17. The method of claim 16 wherein said hydroxy component is a film-forming polymer.

18. The method of claim 17 wherein said film-forming polymer is an acrylic polyol derived from a hydroxyalkyl acrylate and/or a hydroxyalkyl methacrylate.

19. The method of claim 18 wherein said acrylic polyol has a peak molecular weight ranging from about 1000 to 50000 and said anhydride component (B) of said topcoating composition is a film-forming polymer having a peak molecular weight ranging from about 1000 to about 50000, said molecular weights being determined by gel permeation chromatography utilizing a polystyrene standard.

* * * * *